July 6, 1965  W. GRIMM ETAL  3,193,749
DOSIMETER CHARGING UNIT
Filed Aug. 27, 1959

INVENTOR
Wilhelm Grimm &
Gerhard Gollasch
BY George H. Spencer
ATTORNEY

United States Patent Office 3,193,749
Patented July 6, 1965

3,193,749
DOSIMETER CHARGING UNIT
Wilhelm Grimm and Gerhard Gollasch, Ulm (Danube), Germany, assignors to Telefunken Aktiengesellschaft, Berlin, Germany
Filed Aug. 27, 1959, Ser. No. 836,365
Claims priority, application Germany, Aug. 30, 1958, T 15,564
8 Claims. (Cl. 320—1)

The present invention relates to a charging device for a protective radiation dosimeter of pocket size.

It is necessary that persons in areas subjected to gamma rays be informed when relatively high radiations are present. For this purpose, relatively inexpensive protective dosimeters of pocket size are employed. In such a device, the ionizing property of the gamma rays is used to discharge a capacitor by ionization. The charged condition of the capacitor is indicated by means of a quartz filament serving as an electrometer. From time to time, the capacitor of the dosimeter has to be recharged. For this purpose, a portable charging unit has been known, wherein a relatively low battery voltage is converted to a higher voltage and rectified for charging the capacitor in the dosimeter. As a result of this, a voltage considerably higher than the battery voltage is obtained for the charging operation.

The prior art charging units were designed in such a manner that the dosimeter could be inserted in the axial direction in a fitting and then pressed therein to actuate a spring-loaded charge switch which every dosimeter possesses. For this operation, a stationary support was necessary to hold the charging unit because the operator needed both hands for the charging operation. In spite of this, a reliable guidance of the dosimeter in the contact socket was not assured, due to the force required to hold it. Furthermore, in such prior art charging apparatus, only a certain force which could not be controlled by the operator had to be applied, because in case of insufficient pressure, the charging operation would not take place, due to the lack of contact engagement by the charging switch, while in case of too great a force, a short circuit could readily be obtained causing the indicating filament to register outside of its indicating range.

It is an object of the present invention to overcome all of these difficulties during the charging operation and to provide a simple charging unit operable by one hand.

It is another object of the invention to provide in such a charging unit means whereby two standard types of dosimeters which are different in length and diameter can be charged.

It is a further object of the invention to provide a charging unit having a cavity at one of its longitudinal surfaces, said cavity corresponding to the length and diameter of the dosimeter to be received, and wherein one of the ends of the cavity carries a charging contact and the other end is inclined to wedge the dosimeter against the contact. The cavity is open so that full visibility is assured when the dosimeter is being charged.

It is a still further object of the invention to provide the holder of the charging contact as a transparent lens body, so that it is possible to observe the quartz filament during charging, and to provide an electric lamp in the charging unit at the location where the charge switch is connected to the dosimeter.

The present invention teaches the use of a two-stage push-button switch which, during depressing of the dosimeter to a certain depth, first lights the electric lamp and which, upon further depressing the dosimeter, closes the charging circuit. As a result of this, the operator can observe the electrometer in the dosimeter without energizing the charging circuit. The operator can also control the charging operation and recognize the instant at which the dosimeter is sufficiently charged and can then remove the pressure exerted on the dosimeter by his hand to thereby interrupt the charging circuit.

In order to compensate for variations in the size of the dosimeter, due to manufacturing tolerances, the bracket supporting the charging contact presented to the dosimeter is made displaceable in the longitudinal direction. The pressure-opposing movement of the bracket may be provided for example by a spring which is selected in such a manner that the charge switch of the dosimeter is closed when it is pressed into the unit.

In place of such construction, it is possible to design the slanting edge of the charging unit as a compression spring which also produces the necessary contact closing pressure, so that insertion of dosimeters with relatively large manufacturing tolerances is possible. Also, where different dosimeter shapes are employed, an adapter may be used, i.e., placed on the charging contact of the dosimeter to compensate for the different lengths of the dosimeters to be charged. In such case, the charging unit has to be constructed in such a manner that, without use of the dapter, the longest of the standard dosimeters can be charged. The adapter is suitably made of transparent material.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Figure 5:
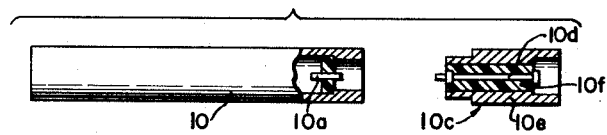

In FIGURE 5 a dosimeter and an adapter are shown.

Figure 1:
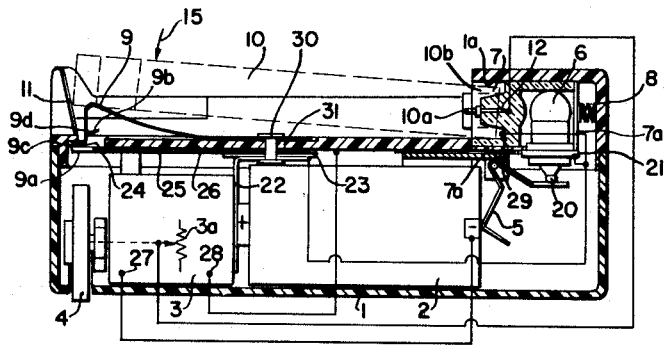
FIGURE 1 shows a longitudinal section through an embodiment of the charging unit according to the invention, taken along line 1—1 of FIGURE 2.
Figure 2:
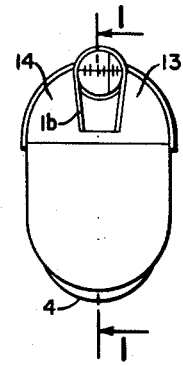
FIGURE 2 is an end view of the charging unit according to FIGURE 1.
Figure 6:
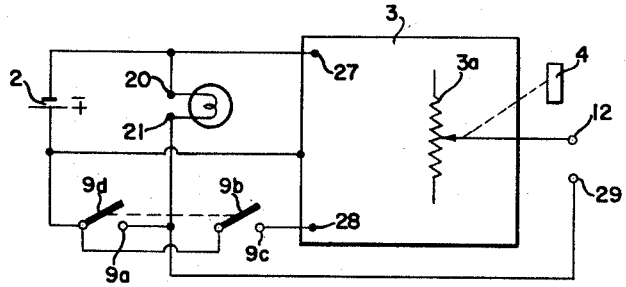

FIGURE 6 is a circuit diagram of the electrical components incorporated in the charging unit of FIGURE 1.

Figure 1A:
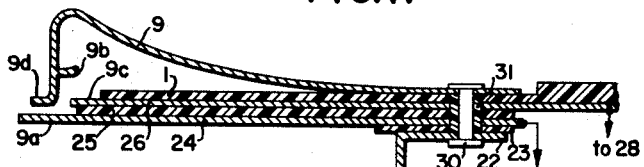
FIGURE 1a is an enlarged sectional view of a detail of the structure shown in FIGURE 1.
Figure 3:
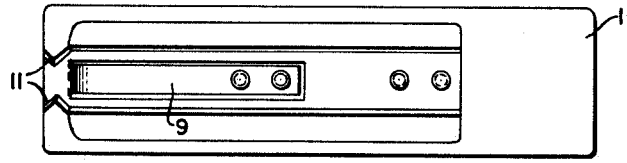
FIGURE 3 shows a plan view of the charging unit according to FIGURE 1. The dosimeter is not shown in this figure.

The charging unit according to these figures is built in a casing 1 which is suitably made of plastic material. A battery 2 and a D.C. converter 3 controlled by a potentiometer 3a are provided in the casing, wherein the converter 3 serves to multiply the battery voltage, and the potentiometer 3a is used for adjusting of the charging voltage by means of a control disk 4 which is accessible from the outside through an opening in the casing 1. A leaf spring 5 serves as an electrical connection between one terminal of the battery 2 and an electric lamp 6 and, simultaneously, retains the battery 2 and the lamp 6 in position within the casing 1. A transparent abutment 7 is located in front of the lamp 6, where it serves as a lens for the light rays of the lamp 6 and also supports an electric terminal 12 adapted to engage a charging switch and contact 10a of a dosimeter 10, shown in dashed lines. The lamp 6 and the lens 7 are secured to one another and are both displaceably mounted in the casing 1 on a bracket 7a in such a manner that tolerance variations in the lengths of the dosimeters 10 to be inserted in the charging unit are compensated. A compression spring 8 is seated between a rear wall of the casing 1 and the wall of the bracket 7a supporting the lens and lamp assembly 7, 6. This spring tends to displace said assembly in the direction of the dosimeter to be inserted in the casing 1. The force of this spring 8 has to be such that it produces the pressure for closing the charging switch 10a of the dosimeter. A contact spring 9 in the form of a longitudinal leaf spring with a bent front end is provided, this contact spring 9 having two contact portions 9b and 9d, the arrangement of these portions being such that when the dosimeter is introduced and depressed along the inclined edge 11 of the casing 1 in the direction of the arrow 15, the portion 9d will first engage the contact portion 9a, this being the free end of contact spring 24, and upon continued depression of the spring 9, the contact portion 9b will engage the contact portion 9c, this being the free end of another contact spring 26, the springs 24 and 26 being spaced apart by an insulating strip 25, as is best shown in FIGURE 1a. The springs 9, 24 and 26, and the strip 25, as well as another insulating strip 23 and one leg of an angle bracket 22, are secured to the casing 1 in any suitable manner, as for example by a screw or rivet 30 which also serves to establish an electrical connection between the bracket 22 and the spring 9, there being an insulating sleeve 31 to maintain the springs 24 and 26 out of contact with the rivet 30.

The electrical connections of the parts which are shown both structurally and schematically in FIGURES 1 and 1a and purely schematically in FIGURE 6, are as follows: the negative terminal of the battery 2 is connected to the terminal 20 of the lamp 6 by way of the spring 5, while the positive battery terminal is connected to the lamp terminal 21 by way of the bracket 22 which abuts against the positive battery terminal, the rivet 30 or other suitable connection leading to the spring 9, the switch constituted by the cooperating contact portions 9d and 9a, the leaf spring 24, and an electrical connection between the spring 24 and the terminal 21.

The bracket 22 also abuts against the housing of the converter 3 so that the latter is likewise connected to the positive battery terminal. Furthermore, the negative battery terminal is connected to one input terminal 27 of the converter 3, while the second converter input terminal 28 is connected to the contact portion 9c by way of the spring 26 and an appropriate electrical connection leading to this spring.

Additionally, the adjustable tap of the potentiometer 3a is connected to the terminal 12, while the contact 29 is connected to the spring 24 having the contact portion 9a, so that when the switch constituted by the contact portions 9a, 9d is closed, the dosimeter connected across the contacts 12 and 29 will be charged.

When the contact spring 9 is depressed, the above-described lamp circuit is first established by the engagement of the contact portions 9d and 9a, and thereafter, i.e., during further depressing of the spring 9, the charging circuit is closed by the engagement of the contact portions 9b and 9c, thereby initiating the charging of the dosimeter 10. It will be understood that thanks to the provision of the two movable contact portions 9d and 9b, the switches 9d, 9a and 9b, 9c can be closed in sequence, so that it is possible to determine the exact point at which just the lamp circuit and not the charging circuit is closed.

The operator of the device according to the invention can grip the charging unit with the dosimeter placed thereon in one hand and can selectively initiate the charging operation by simply depressing the dosimeter in the charging unit, whereby the operator can first check the charge condition of the capacitor in the dosimeter with the aid of the built-in lamp 6. Simultaneously, the adjusting control disk 4 of the potentiometer 3 can be operated by the same hand of the operator. The dosimeter is guided into the charging cavity 1a to engage the charging contact by the socket means 10b forming a channel-like member.

The position of the quartz filament in the dosimeter can be observed by looking into the dosimeter through a window provided by a notch 1b in the inclined wall 11 between parts 13 and 14 of the wall.

The charging unit may be modified, for example, by fixing the lens 7 in the casing 1 and then providing in place of the stationary wall parts 13 and 14 of the inclined wall 11 an inclined compression spring (not shown), so that variations in the lengths of the dosimeters can be compensated.

Figure 4:
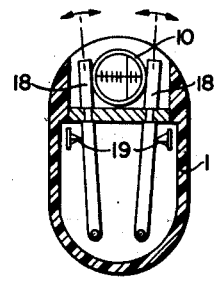
FIGURE 4 shows another design of the electric contacts of the lamp circuit and the charging circuit.

Other designs of the electric contacts of the lamp circuit and the charging circuits are possible. For example, a forked member (FIG. 4) made of resiliently yielding contact elements 18 may be provided. By introducing the dosimeter 10 between the two elements 18 constituting the fork, the latter are moved apart into engagement with stationary contacts 19 and thereby tension is provided in the contact engagement. The lamp means shown in FIGURE 1 might also be modified. If necessary, the charging unit can be made water-and air-tight.

Where dosimeters of different shapes or lengths are to be accommodated within the charging unit, a suitable adapter means may be used. Such an adapter 10c is shown in FIGURE 5 in conjunction with a dosimeter 10 having a length less than that of the longest possible dosimeter. The adapter 10c has inner and outer conductors 10d and 10e which are insulated from each other by a sleeve 10f. The dosimeter 10, shown in FIGURE 5 is, as stated above, shorter than the longest dosimeter which can be received by the charging unit, and in order to compensate for this shorter length, the adapter 10c can be inserted between the dosimeter contact 10a and the electrical terminal 12 (FIGURE 1). The adapter may, if desired, be made of transparent material.

We claim:

1. For use with a dosimeter which has a charge indicator and a charging switch, a charging unit comprising a casing containing a source of charging voltage, said casing having an overall length which is greater than that of the dosimeter to be charged and being provided with a cavity having opposite end faces, which cavity is shaped to be able to receive the dosimeter to be charged, there being at one end face of said cavity charging contact means electrically connected with said source of charging voltage, said contact means making contact with the charging switch of the dosimeter after the same has been placed into said cavity, there being at the other end of said cavity a slanting abutment along which the dosimeter is pressed while it is in the process of being introduced into said cavity so that at a certain point during the insertion of the dosimeter into said cavity, the charging switch of the dosimeter is closed due to counter pressure exerted by said contact means.

2. In a unit as set forth in claim 1, a contact-support member in which said charging contact means is mounted, said member being a transparent lens facing the cavity; and light means opposite the lens connected with said source for illuminating the dosimeter charge indicator.

3. In a unit as set forth in claim 2, a two-stage switch in the cavity and depressed by the dosimeter as it is inserted therein, the first stage of the switch being connected between the light means and the source, and the second stage being connected between the source and the charging voltage to the charging contact means, whereby upon insertion of a dosimeter in the cavity the switch will first energize the light means and subsequently initiate a charging voltage.

4. In a unit as set forth in claim 3, said two-stage switch comprising a moving member and two leaf-spring members, whereby the first leaf-spring member is contacted by the moving member before it contacts the second leaf-spring member.

5. In a unit as set forth in claim 2, said contact support member being reciprocably mounted in the casing, and spring means in the casing urging the support member toward said abutment with a force greater than that required to close said charging switch.

6. In a unit as set forth in claim 1, a potential-controlling potentiometer in said casing and connected with said source and adjustable by external control means to regulate the magnitude of the charging voltage.

7. In a unit as set forth in claim 1, intended for charging various dosimeters of different sizes, said cavity being large enough to receive the largest of the dosimeters; and adapter means for connection to the charging contact means and extending the latter toward said abutment to accommodate smaller dosimeters.

8. In a unit as set forth in claim 2, a two-stage switch in said cavity and actuated by the dosimeter as the same is inserted therein, one stage of said switch being connected between said light means and said source and the other stage of said switch being connected between said source and the charging voltage to the charging contact means.

References Cited in the file of this patent
UNITED STATES PATENTS

| | | |
|---|---|---|
| 2,751,544 | Stirnkorb | June 19, 1956 |
| 2,765,413 | Andrews | Oct. 2, 1956 |
| 2,770,765 | Negus | Nov. 13, 1956 |
| 2,780,766 | Hedding et al. | Feb. 5, 1957 |